Patented Feb. 26, 1952

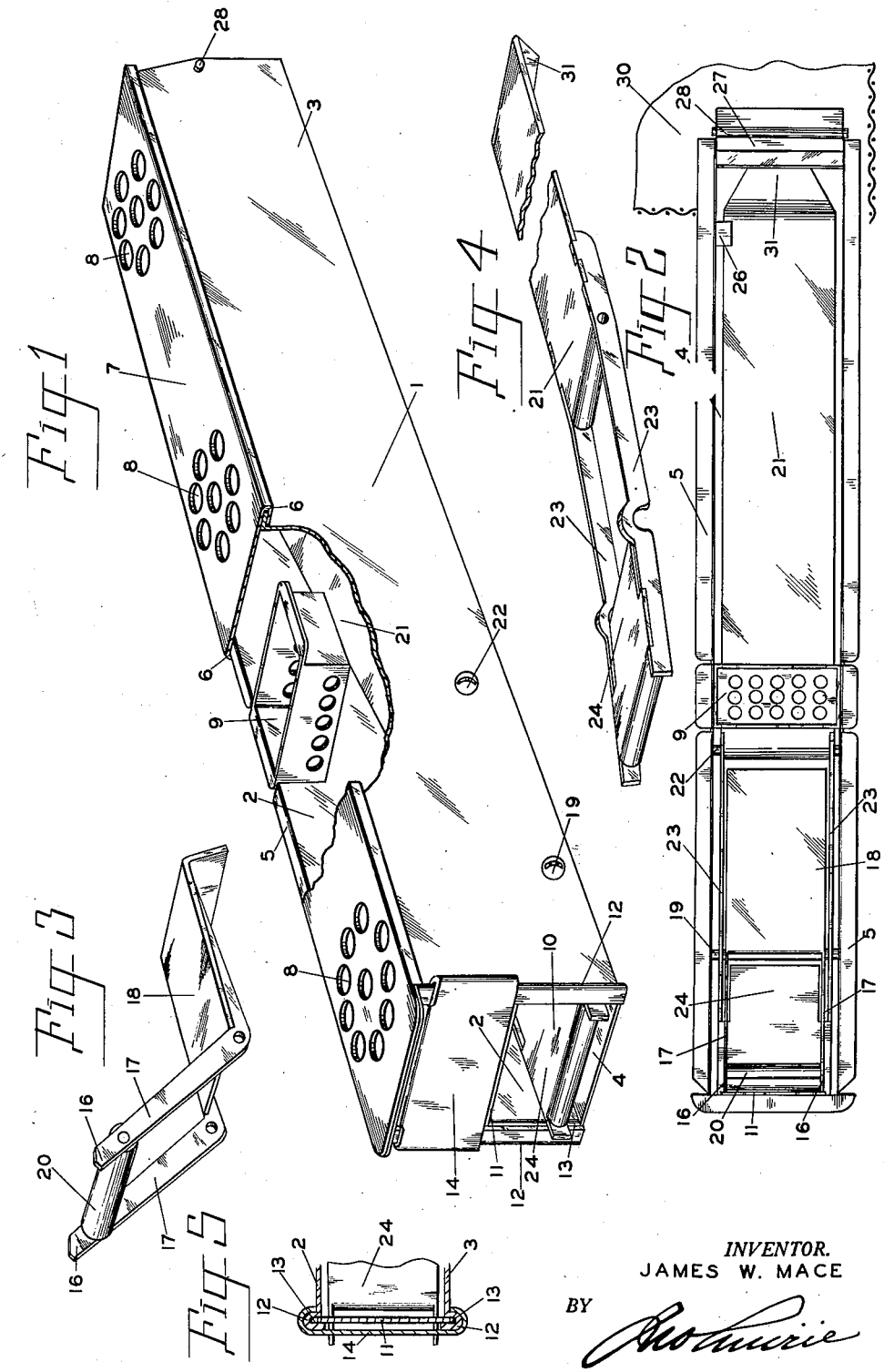

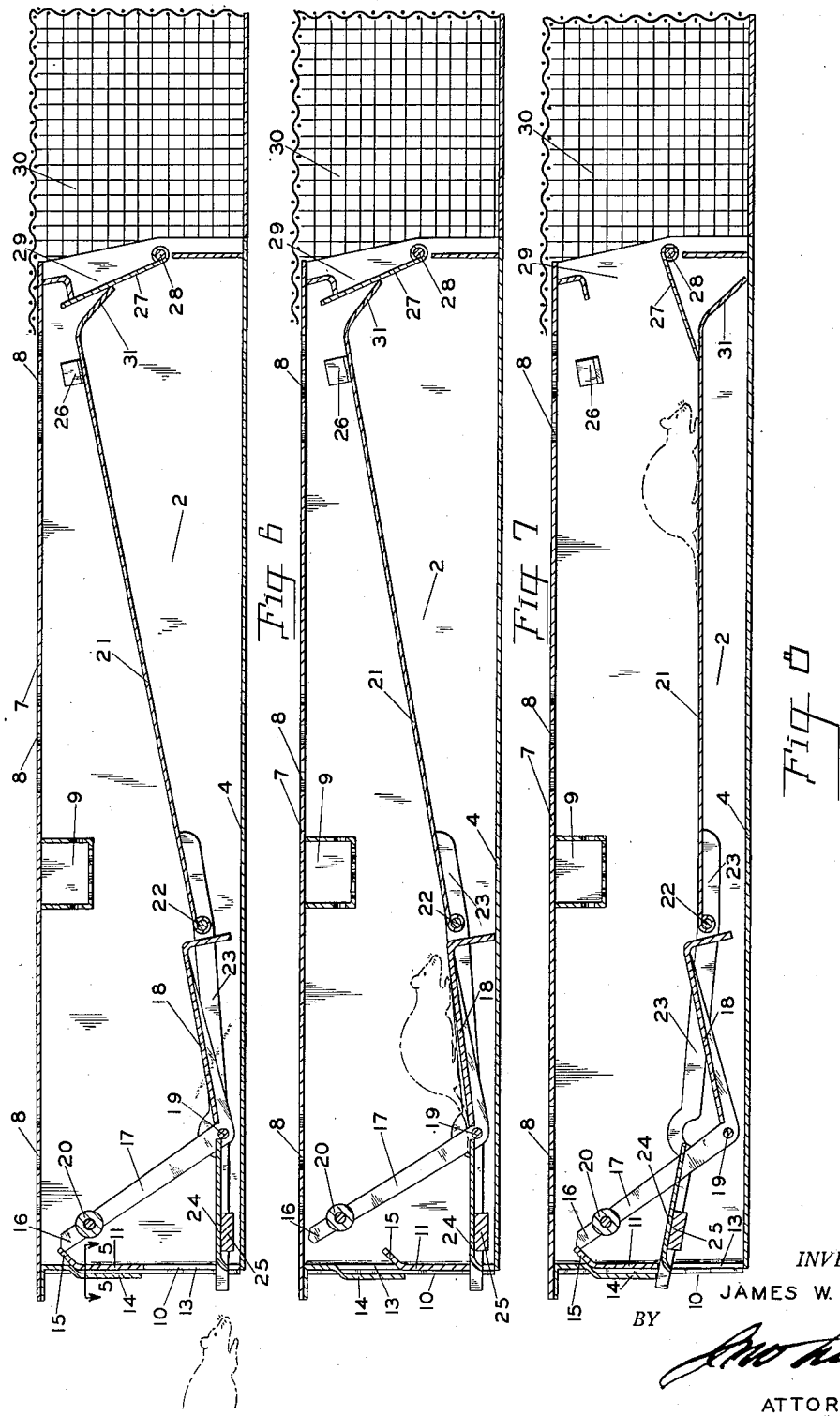

2,587,349

UNITED STATES PATENT OFFICE 2,587,349

ANIMAL TRAP

James W. Mace, Rainier, Oreg., assignor of one-half to William C. Young and one-half to Harold Young, both of Rainier, Oreg.

Application April 1, 1950, Serial No. 153,320

1 Claim. (Cl. 43—76)

This invention relates to animal traps and the primary object of the same is to provide a boxlike animal trap wherein the animal enters the trap, operating automatic gates and thereby directing the animal to finally enter a pen or corral.

In the carrying out of this object, the animal enters an open gate. Immediately after entering this gate, the gate is automatically closed by the weight of the animal on a platform. The animal further progresses through the trap entering onto a second platform, the said gate is automatically opened for the next animal to enter.

At the same time the animal opens the gate, the secondary counterbalanced platform opens a second gate leading into a pen or corral. After the animal enters the corral, the said second gate automatically is closed by the said secondary platform.

I have provided a bait holding container for attracting the animals into the trap.

In the carrying out of the above object, a simple mechanically constructed trap is provided requiring little attention other than maintaining bait therein and removing the animals from the pen.

These and other incidental objects will be apparent in the drawings, specification and claim.

Referring to the drawings:

Figure 1 is a perspective view of my new and improved animal trap, parts being broken away for convenience of illustration, and the entrance gate shown in open position.

Figure 2 is a plan view of my trap with the cover plate removed, showing its position relative to the pen or corral.

Figure 3 is a perspective view of the counterbalanced platform associated with the entrance gate for holding the gate open or allowing the same to close.

Figure 4 is a perspective view of the secondary counterbalanced platform, which is for the purpose of opening the entrance gate as well as opening the exit gate and closing the same.

Figure 5 is a fragmentary sectional plan view, taken on line 5—5 of Figure 6.

Figure 6 is a longitudinal sectional view of the trap showing the entrance gate open, the exit gate closed and the animal about to enter.

Figure 7 is the same as Figure 6, except that the animal has entered and has tripped and closed the entrance gate, the exit gate still being closed.

Figure 8 is the same as Figures 6 and 7, except that the secondary platform has been lowered by the weight of the animal opening the exit gate and resetting the entrance gate.

Referring more specifically to the drawings:

My new and improved animal trap consists of a relatively long boxlike case 1, consisting of side walls 2 and 3 joined to a bottom 4. Outwardly extending flanges 5 are formed on the upper edges of the side walls 2 and 3 and are adapted to receive the channel-ways 6 of the removable cover 7, which is slid onto the flanges from the end of the trap or removed the same way.

The cover plate 7 has holes 8 passing therethrough for permitting light and air to enter the trap. These holes also act in distributing the odor contained within the removable bait box 9.

The entrance gate and opening 10 is provided in the end of the trap for the animal to enter when the gate 11 is in the position illustrated in Figure 6. The side walls 2 and 3 have a reverse bend 12, best illustrated in Figure 5, which provides a guideway 13 in which the gate 11 operates vertically up and down.

An end wall 14 is provided for closing the end of the trap above the opening 10 and is best illustrated in Figures 1, 5, 6, 7 and 8. The upper edge of the gate 11 is turned at an angle as indicated at 15. This angle coooperates with the ends 16 of the arms 17, which are associated with and forming part of the platform 18. The arms 17 are journalled to the cross shaft 19, the said shaft being fixedly secured to the side walls 2 and 3 of the trap.

A counterbalancing weight 20 is fixedly secured to the upper ends of the arms 17 and is adapted to pivot the said arms and platform 18 about the cross shaft 19 to the position illustrated in Figures 6 and 8. A secondary platform 21 is pivotally mounted to the cross shaft 22 and has arms 23 extending beyond said cross shaft through the opening 10.

A platform 24 is fixedly mounted to the arms 23 and provides an entrance platform for the animal. A counterweight 25 is also associated with the platform 24 and the arms 23 which raises the secondary platfrom 21 to the position illustrated in Figures 1, 6 and 7 against a stop 26. The exit gate 27 is pivotally mounted to the cross shaft 28 which is journalled within the side walls 2 and 3 of the box 1 and closes the opening 29 leading into the pen or corral 30. The end 31 of the platform 21 holds the said gate in closed position as illustrated in the above referred to figures.

I will now describe the operation of my new and improved animal trap. The animal enters the opening 10, travels on over the platform 24 and on to the pivotally mounted platfrom 18. The weight of the animal will overcome the weight 20 removing the ends 16 of the arms 17 from under the offset 15 of the gate 11, permitting the said gate to travel down its guideways 13 by gravity to the position illustrated in Figure 7.

The animal will then sooner or later travel further on to the secondary platform 21, which will overcome the counterbalancing weight 25 on the end of the arms 23, pivoting the arms and platform about the cross shaft 22 permitting the pivotally mounted gate 27 to open as best illustrated in Figure 8. This will allow the animal to enter the pen or corral 30.

At the same time this happens, the arms 23 raise the gate 11 to the position illustrated in Figures 6 and 8, the counterweight 20 on the arms 17 resetting and holding the ends 16 of the arms under the angle or offset 15. This also resets the platform 18 to the positions illustrated in Figures 6 and 8. When the animal leaves the secondary platform 21, the counterweight 25 will lower the arms 23 and raise the platform 21, whereby end 31 will automatically close the gate 27 ready for the next animal to enter.

Although certain specific embodiments of the invention have been shown and described, it is obvious that many modifications thereof are possible. The invention, therefore, is not to be restricted except in so far as is necessitated by the prior art and by the spirit of the appended claim.

I claim:

An animal trap comprising an elongated housing having an entrance opening in one end and an exit opening at the other end, a cage at the exit end of said housing, a slidable front gate to close the entrance opening, said gate having a lip on the rear upper edge, a gate at the rear end of the housing to close the exit opening, a pair of spaced apart substantially horizontal bars pivoted in the housing, the forward ends of the bars being in the path of movement of the slidable front gate, a front platform supported on the forward ends of the spaced apart horizontal bars, a rear platform secured to the rear ends of the spaced apart horizontal bars and extending toward the rear gate and in contact therewith, the forward end of the rear platform being spaced from the rear edge of the front platform, a pair of substantially L-shaped bars pivoted in the housing adjacent the rear end of the front platform, the upper ends of the L-shaped bars normally engaging the lip on the front slidable gate to hold said gate in open position when the trap is set, a weight at the upper ends of the L-shaped bars to tilt same by gravity to hold open the front gate, an intermediate platform mounted on the L-shaped bars and fitting in the space formed between the rear end of the front platform and the forward end of the rear platform, the front, intermediate and rear platforms being in substantial alignment when the trap is set, whereby when an animal steps from the front platform onto the intermediate platform the L-shaped bars will tilt and the upper ends thereof will release the slidable gate and close the entrance opening, and when the animal steps from the intermediate platform to the rear platform, the L-shaped bars will assume normal position and the weight of the animal will depress the rear platform, and allow the rear gate to open by gravity, and the forward ends of the said spaced apart horizontal bars will rise and open the front gate to be engaged by the upper ends of the L-shaped bars.

his
JAMES W. ✕ MACE.
mark

Witness to mark:
ALFRED S. MAY.

REFERENCES CITED

The following references are of record in the file of this patent:

UNITED STATES PATENTS

| Number | Name | Date |
|---|---|---|
| 1,246,857 | Bludworth | Nov. 20, 1917 |